Oct. 7, 1930.  W. C. GIBSON  1,777,842
COOLING COIL HEADER FOR ICELESS REFRIGERATORS
Filed Oct. 5, 1928
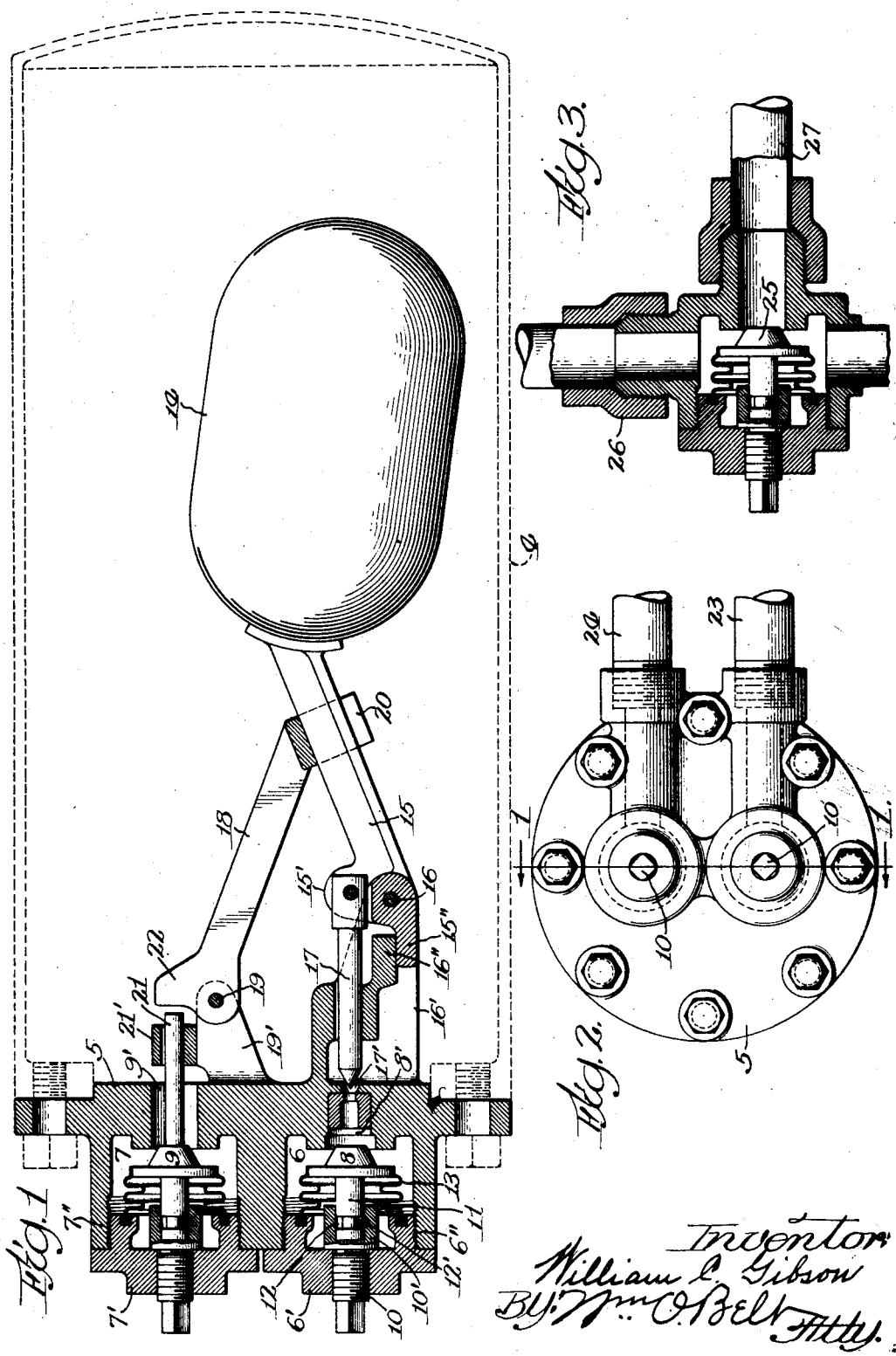

Patented Oct. 7, 1930

1,777,842

UNITED STATES PATENT OFFICE

WILLIAM C. GIBSON, OF CHICAGO, ILLINOIS

COOLING-COIL HEADER FOR ICELESS REFRIGERATORS

Application filed October 5, 1928. Serial No. 310,585.

This invention relates principally to iceless refrigerating systems and its object is to lock the float which controls the inlet in a cooling coil of an iceless refrigerator system to prevent damage to the float and its associated parts in shipment which is likely to occur if the float is free to move.

In the accompanying drawings I have illustrated the invention in a selected embodiment and referring thereto Fig. 1 is a sectional view through the header of the tank of a cooling coil of an iceless refrigerating system showing my invention therein, the section being taken on line 1—1 of Fig. 2.

Fig. 2 is a front elevation of the header.

Fig. 3 is a sectional view showing a packless fluid valve embodied in a riser shut-off valve.

Referring to the drawings the tank 4 has a header 5 provided with an inlet valve chamber 6 and an outlet valve chamber 7, these chambers having caps 6' and 7' which are screw threaded at 6" and 7" in the chamber walls and made fluid tight by the use of white lead or other suitable material. The inlet valve disk 8 operating in the chamber 6 is adapted to close a port 8' leading to the tank 4, and the outlet valve disk 9 is adapted to close a port 9' leading from tank 4. The inlet valve has a stem comprising two members which are conjointly and relatively movable; one of these members 10 being screw threaded in the cap 6' for adjusting the valve and having a socket 10' to receive the end of the other member 11 which is integral with the valve disk 8. The integral member 11 has a peripheral groove 12 to receive a link pin 12' for retaining the end of the member 11 in the socket 10'. The members of the stem will move in and out conjointly when the adjusting member 10 is adjusted but the integral member 11 and the valve will not turn with the adjusting member 10 when the latter is adjusted. While the threaded joint 6" may be made fluid tight by the use of some suitable material, such as white lead, the threaded engagement of the adjusting member 10 with the cap can not be made fluid tight in this manner and without some means to prevent the escape of fluid about the adjusting member there would be liability of leakage. To prevent this and still permit adjustment of the valve I provide a flexible corrugated cylinder of the kind commercially known as a sylphon 13 which is fastened at one end to the valve disk 8 and at its other end to the cap 6' and effectually prevents leakage of fluid into that part of the chamber which communicates with the threaded passage receiving the adjusting member 10. By this means the valve may be freely adjusted to and from its seat for closing or opening the inlet port 8' and for controlling the passage of fluid in to the tank 4 and while this adjustment is accomplished by the adjusting member of the stem the valve itself is only movable in a right line and does not rotate with the adjusting means. The sylphon effectually prevents leakage of fluid through the adjustable connection of the valve stem with the cap of the valve chamber and still permits the free adjustment of the valve. The outlet valve is constructed like the inlet valve and need not be further described. The float 14 is carried by an arm 15 which is pivoted at 16 on a bracket 16' projecting inward from the head 5. A needle valve 17 is arranged to engage a seat 17' at the inner end of the port 8' and this valve is pivotally mounted on a lug 15' on the arm 15 and above the pivot 16. The needle valve is operated in the usual manner with the rise and fall of the float. I provide simple means for securing the float in an immovable or rigid position in the tank for shipment and so that the float will not knock about in the tank and damage itself and other parts. This means comprises a locking arm 18 which is pivoted at one end at 19 to projection 19' on the head 5. The other end 20 of the locking arm is shaped suitably to slidably engage the float arm 15 and so that the float is free to move under ordinary working conditions. A push rod 21 is secured to the outlet valve disk 9 and extends through a guide 21' on the projection 19'. A lug 22 on the pivot end of the locking arm 18 is alined with the push rod 21 so that when the valve disk 9 is screwed in tight the push rod will engage lug 22 and hold the float in down position with the end 15″ of the float arm 15 in engagement with the stop 16″ on the bracket 16‴. Thus the float arm and float are locked in rigid position for shipment and are automatically released when the outlet valve is adjusted for service. An inlet pipe 23 communicates with valve chamber 6 and an outlet pipe 24 communicates with valve chamber 7.

The invention is especially useful when embodied in the header of a cooling coil for iceless refrigerators because it accomplishes many things desirable and necessary in such installations. Primarily it enables a cooling coil unit to be assembled at the factory and delivered at any time for any installation, the valves being capable of adjustment for the particular installation by simply manipulating the adjusting members of the stem and without requiring special care or skill. It will be readily understood that if the screw threaded connection of the valve adjusting means were not protected against leakage there would always be the liability of fluid escaping from the system, and this would be highly objectionable and, with some systems, might be dangerous. Special skilled attention has been required heretofore in adjusting the valves and guarding against leakage at the valves but this is not necessary with my invention because the valve caps are sealed in place at the factory and the valves are protected against leakage about the adjusting means by the flexible sylphons which form a seal between the valve side and the adjusting means side of the valve chamber and effectually prevent leakage about the adjusting means. It is also important that the float arm and float should be held rigid or immovable until the cooling coil unit is fully installed and the valves adjusted for operation, and this is accomplished in a simple and novel manner by the locking means of my invention. The sylphon protector to prevent leakage may be used on other valves in the same manner as it is used on the inlet and the outlet valves of the cooling coil. There are a number of valves in an iceless refrigerator system which require adjustment and protection against leakage and in Fig. 3 I have shown a shut-off valve 25 like the inlet valve and the outlet valve heretofore described but arranged in a riser 26 for controlling a connection 27. The sylphon of this valve functions and operates the same as it does in the valves heretofore described.

I have shown the invention in a selected embodiment which I consider suitable for the purposes intended but I reserve the right to make all changes in the form, construction and arrangement of parts within the scope of the following claims.

I claim:

1. The combination of a valve, a float, and an arm carrying the float and connected with the valve and means for holding the float arm and float in rigid position comprising a locking arm slidably engaged with said float arm and permitting normal operation of the float and valve, and means for causing said locking arm to hold said float arm rigid.

2. The combination of a valve, a float, and an arm carrying the float and connected with the valve and means for holding the float arm and float in rigid position comprising a locking arm slidably engaged with said float arm and permitting normal operation of the float and valve, a push rod to engage the locking arm and cause said locking arm to hold said float arm rigid, and means for operating said push rod.

3. The combination of a tank, a header for the tank having an inlet opening and an outlet opening therein, a valve for the inlet opening and a valve for the outlet opening, a pivoted arm connected with the inlet valve, a float on said arm for controlling the operation of the inlet valve, a locking arm pivoted on the header and slidably engaged with the float arm, and means operated by the outlet valve for causing said locking arm to hold said float arm and float rigid.

WILLIAM C. GIBSON.